May 29, 1962 L. STARK 3,036,568
PUPILLOMETER
Filed Jan. 20, 1958
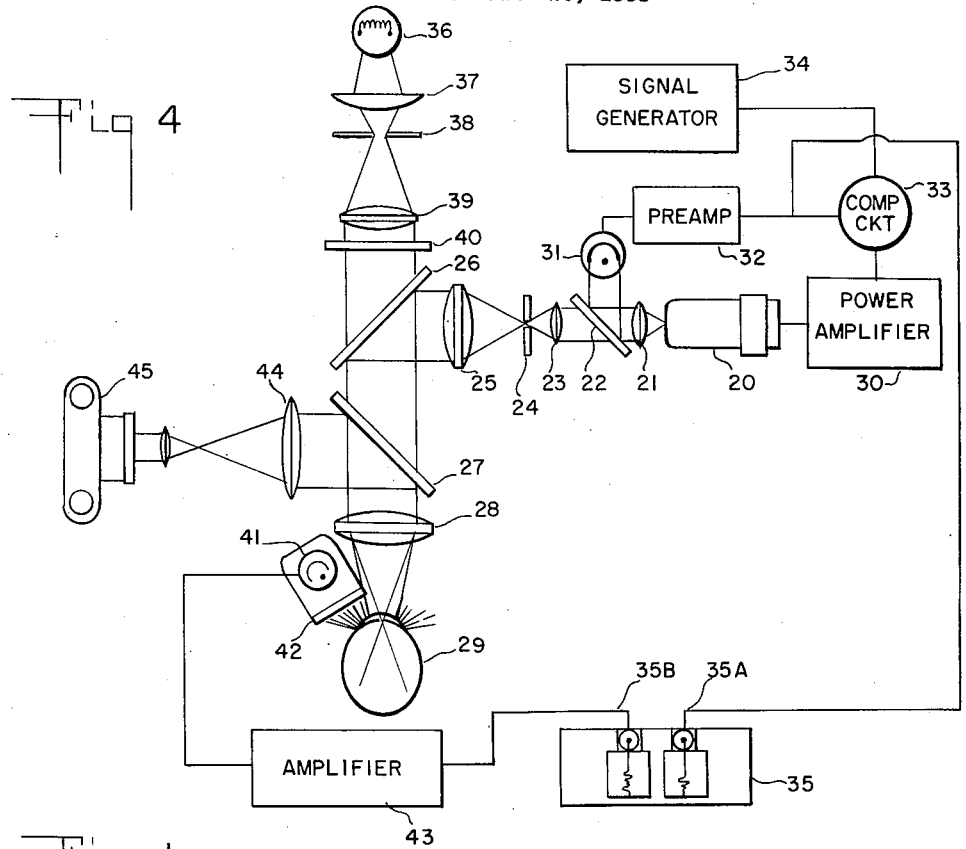
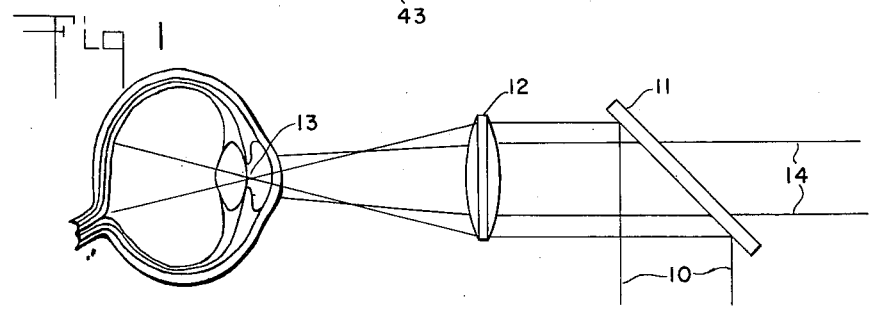
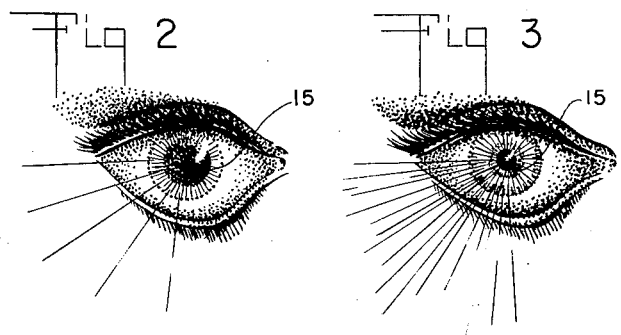
INVENTOR.
LAWRENCE STARK
ATTORNEY 3,036,568
PUPILLOMETER
Lawrence Stark, New Haven, Conn.
(99 Russell Ave., Watertown, Mass.)
Filed Jan. 20, 1958, Ser. No. 709,824
7 Claims. (Cl. 128—2)

The subject of this invention is a novel pupillometer apparatus. More particularly, the present invention is directed to analyzing the response of the human eye to light stimulus. It has been shown that several kinds of pupillary responses of the eye and portions of the brain which control its muscular reaction are related to and indicative of a number of diseases in various stages, as for example, multiple sclerosis as well as certain neurophysiological conditions of the person undergoing examination.

The object of the present invention is to accurately establish the pupillary response of the human eye by measuring infrared energy reflected from the eye and correlating it with that which initially impinged upon the eye.

An ancillary object of the present invention is the precise measurement of the phase angle between quantitatively modulated light directed to the eye and consequent pupillary response under varying conditions.

Other objects, features, and advantages of the present invention will appear from the disclosure which follows.

Through the use of the present invention, visible light is directed in modulated form to the eye of a person being examined. Simultaneously, infrared energy is directed to the eye of the person under examination and infrared sensitive means is positioned to receive infrared energy reflected from the eye. Since infrared rays are substantially absorbed by the retina but reflected by the iris, the instantaneous amount of infrared energy reflected by the eye is a measure of the pupillary response of the eye to the stimulus of light.

By means of the present invention, visible light of various colors may be used as stimuli and the light quantitatively controlled by cyclical modulation in accordance with various repetitive functions such as sinusoidal, square wave or impulse waveforms. By contrast, the light stimulus may be modulated by a random function such as noise to test certain kinds of response. In accordance with the teaching of the present invention, the modulated stimulus is recorded simultaneously with the indicated pupillary response so that the two may be correlated and the condition of that portion of the neuro-optical system under observation may be readily discerned.

In accordance with a highly desirable feature of the present invention, the actual visible light stimulus is constantly monitored in order to provide for correction of changes or nonlinearities in the operation of amplifiers, power source, or other portions of the system.

An alternative use of the apparatus of the present invention involves the "open loop" technique as distinguished from the "closed loop" technique described above. In this use, the visible light stimulus is directed to the eye of the person under examination in such a manner that the pupil muscle cannot exclude any of the entrant light by contracting to its smaller size. Certain important facts concerning the neuro-optical system of the person being examined can be established through the open loop technique, and provide the means for plotting a Nyquist diagram which is indicative of the response of the patient's neuro-optical system under varying conditions.

Abnormalities, neurophysiological defects and deterioration of the muscular reflexes may be indicated by comparison of such a Nyquist diagram to known and established normal data.

Yet another important way in which the present invention may be used is to stimulate the pupil reflex by concentrating a very small image of the light source on the edge of the iris muscle. This induces an oscillation of the pupillary muscle and furnishes information which can be compared with other data.

The novel features and operation of the present invention will be better understood from the discussion and explanation of the disclosed embodiment taken together with the accompanying drawings, in which FIG. 1 is a cross-sectional view of the human eye positioned to receive the two types of energy which are directed to it;

FIGS. 2 and 3 are pictorial illustrations of typical extremes of pupillary response of the eye of a person undergoing examination by use of the present invention; and FIG. 4 is a schematic diagram of a complete operative apparatus embodying the present invention.

As shown in FIG. 1, two types of energy are directed to the eye of the person undergoing examination. Visible light stimulus within the area indicated by the rays 10 is reflected by a partially reflective element 11 and is focused by an appropriate optical element 12 upon the pupil of the eye approximately at the point 13. The light stimulus enters the pupil focused to a small spot. The light is directed to the pupillary area so that, as the pupil size changes, the iris cannot intercept any light regardless of how small the pupil area becomes. This mode of analysis and response of the pupillary reflex may be referred to as the "open loop technique."

Infrared energy as indicated by the rays 14 passes through partially reflective element 11 to the eye of the person undergoing examination. As will be noted from the illustration, the infrared energy reaches the pupillary area in a diffused from rather than sharply focused in the manner of the visible light stimulus. The iris of the eye exhibits the property of reflecting infrared energy whereas the retina of the eye absorbs infrared energy. Accordingly, the amount of infrared energy reflected from the eye is an inverse measure of pupillary area and a direct measure of the change of pupillary area in response to stimulus.

FIG. 2 illustrates the condition where relatively little light stimulus is received by the eye of the patient being examined. The pupil 15 of the patient is large and the iris reflects a relatively small amount of infrared energy, the major part of the infrared rays being absorbed by the retina. However, the eye of the person undergoing examination will normally respond to increased intensity of light stimulus with contraction of the iris, reducing the pupillary area as illustrated in FIG. 3. Thus, as shown in the latter illustration, pupil 15 is greatly reduced in area as compared with the illustration of FIG. 2 and therefore the iris reflects considerably more infrared energy, a small amount of infrared entering the inner eye and being absorbed by the retina.

The nature of pupillary reaction is such that the pupil area will change size in response to variations in visible light stimulus, though such response is unable to intercept the light to change the amount of stimulus which reaches the retina. In other words, regardless of the fact that the visible light stimulus is focused on the pupillary area in such a manner that contraction of the iris cannot intercept light stimulus and thus control the amount of light reaching the retina, the eye will nontheless tend to respond to subsequent diminution of the intensity of light stimulus by enlargement of the pupillary area.

FIG. 4 illustrates a complete apparatus embodying the present invention. The visible light source which is used to stimulate the eye may be a glow lamp 20 capable of being modulated in accordance with various repetitive functions or random functions as desired. The visible light stimulus is collimated by an appropriate lens 21, passes through a partially reflective element 22 of the beam-splitter type and is focused by a lens 23 upon a stop 24. The visible light energy transmitted through the stop 24 is collimated by a lens 25 and a portion of the collimated visible light is reflected by the partially reflective element 26 which is comparable to the partially reflective element 11 of FIG. 1. The visible light passes through a second partially reflective element 27 and is focused by a lens 28 which is comparable to element 12 of FIG. 1. The sharply focused visible light stimulus is directed to the eye of the person undergoing examination, which is positioned as indicated at 29. It has been found in practice that the patient's head and eyes may be kept in a fixed position by having the patient use a biteboard affixed to the apparatus.

The instantaneous intensity of the visible light source 20 is dependent upon the power supplied to it by a power amplifier 30. However, the actual visible light energy emitted by the source 20 may not have a linear relationship to the power with which it is supplied. There may also be long term deterioration of the light source or transient variations in the prime power source, etc. In order to insure that the actual visible light stimulus is modulated and controlled precisely as desired in accordance with any desired function, both as to phase and amplitude, a photocell 31 is provided adjacent the beam splitter 21 and receives a portion of the actual light emitted by the stimulus light source 20. The photocell 31 therefore performs a monitoring function and produces a signal proportional to the amount of energy it receives. Its electrical output signal is amplified in a preamplifier 32 and fed to a comparison circuit 33. The comparison circuit 33 also receives an electrical signal from a signal generator 34 having the waveform of a sinusoidal, square wave, impulse, or other function. The output of the signal generator 34 is compared with the signal produced by the monitoring photocell 31. The comparison circuit 33 produces an output signal which is correlated to the difference between its two input signals. The output difference signal of the comparison circuit 33 is, in turn, fed to the power amplifier 30 to control the power input to the source 30 so that the light stimulus actually emitted by the source 20 is the same in amplitude and phase as the signal produced by the signal generator 34. The output of the preamplifier 32 is connected to one portion 35a of a dual recorder 35 so that the phase and amplitude of the light actually stimulating the eye of the person being examined is precisely recorded and may be correlated with the response of the eye.

The portion of the system described thus far deals with visible light. However, in accordance with the concept of the present invention, visible light stimulus and infrared energy are simultaneously directed to the eye of the person undergoing examination. The visible light is for the purpose of stimulating pupillary response while the infrared portion of the system is used for the purpose of detecting and measuring the amount and rapidity of pupillary response to the visible light.

The source of infrared energy 36 used in the present invention may take the form of an incandescent lamp such as that employed in projection apparatus. A condenser lens 37, suitably positioned adjacent the source 36, collects and concentrates infrared energy which is then directed through a stop 38 and is collimated by lens 39. An infrared filter 40 absorbs any visible light which may be intermixed with the infrared energy emanating from the source 36, thus preventing any but the controlled, modulated light stimulus from reaching the eye of the person being examined. The semireflective element 26 is comparable to element 11 of the schematic illustration of FIG. 1 and, because of its partial reflective properties, allows the infrared energy to pass therethrough in alignment with the visible light reflected from the beam-splitter 26 as previously described. The collimated infrared energy passes through a second semireflective element 27 and is transmitted to the eye 29 by a suitably positioned optical element 28 which is comparable to the lens 12 as shown in FIG. 1. By making the diameter of the stop 38 relatively large as compared to the diameter of the stop 24 "open loop" operation may be obtained. That is to say the visible light is directed wholly into the pupil of the eye because this light is imaged in a small spot commensurate with the diameter of the stop 24 whereas the infrared light is diffused over a larger area which includes the iris commensurate with the larger diameter of the stop 38.

The infrared energy which is not absorbed by the retina is reflected from the iris and is detected by an infrared sensitive device 41 which is provided with an infrared filter 42 so all but infrared energy is excluded from the detector 41. The detector 41 is positioned adjacent the eye but off to one side. Substantial scattered infrared energy is reflected to either side of the eye at approximately an angle of 45° and has been found to be an accurate indicium of pupillary response. The electrial signal produced by the detector 41 as a result of the infrared energy reflected from the iris is fed to an amplifier 43 which, in turn, is connected to the other portion 35b of the dual recorder 35.

The dual recording means 35 is therefore actuated in concert by both the visible light stimulus to the eye and the infrared reflection from the eye which is a measure of the instantaneous pupillary response. The two signals thus recorded provide correlated data which contain phase information as well as amplitude information, and inherently afford indicia of two-fold significance in discerning neurophysiological conditions as has been discussed hereinbefore.

The semireflective element 27 is included in the system as a means by which photographs of the eye may be taken while it is undergoing examination. An appropriate lens 44 forms a photographically reproducible image of the eye which may be recorded by a camera 45 without interfering with the operation of the remainder of the apparatus of the present invention. By calibrating, using the photographic image of the eye, actual pupillary area may be calculated and collated with the other recorded data which the present invention makes possible. The camera 45 or other comparable means may be used with infrared-sensitive film to convert the infrared energy reflected from the eye to a recordable visual representation.

The present invention is a valuable research tool which affords a convenient and accurate means of accumulating data which, when analyzed and properly interpreted, provides an indication of a variety of neurophysiological conditions. One of the advantages of the present invention is that certain diseases and conditions can be discerned through the use of the present invention while still in an incipient stage when other more conventional tests will fail to indicate the condition. The present invention therefore affords a means by which diseases and abnormal conditions can be discovered at an early stage when they are more susceptible to proper treatment.

Because of its simplicity and reliability of operation, the apparatus of the present invention affords a means of clinical diagnosis as well as a valuable tool for basic medical research.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:
1. An apparatus for analyzing the response of the human eye to light stimulus comprising a source of visible light; means for modulating said visible light; means for monitoring said modulated light, said means being operatively connected to control said modulation for maintaining a desired light intensity; means for producing a light modulation signal proportional to the magnitude of said modulated light; optical means for directing said modulated visible light entirely into the pupil of the person being examined; a source of infrared energy; optical means for directing said infrared energy to the eye of the person being examined; infrared sensitive means positioned to receive infrared energy reflected from the eye of the person being examined and producing an infrared signal representative of said reflected infrared energy; and means connected to receive said light modulation signal and said infrared signal for indicating the phase therebetween.

2. An apparatus for analyzing the response of the human eye to light stimulus comprising a source of visible light; means for modulating said visible light; means for monitoring said modulated light, said means being cooperatively connected to control said modulation for maintaining a desired light intensity; means for producing a light modulation signal proportional to the magnitude of said modulated light; optical means for directing said modulated visible light entirely into the pupil of the person being examined; a source of infrared energy; means for directing infrared energy to the eye of the person being examined; infrared sensitive means positioned to receive infrared energy reflected from the eye of the person being examined and producing an infrared signal representative of said reflected infrared energy; and recording means connected to receive and simultaneously record said light modulation signal and said infrared signal.

3. An apparatus for analyzing the response of the human eye to light stimulus comprising, a source of visible light, means for modulating said visible light, means for monitoring said modulated light, said means being operatively connected to control said modulation for maintaining a desired light intensity, a source of infrared energy, optical means for directing said modulated visible light and said infrared energy to the eye of a person being examined, infrared sensitive means positioned to receive infrared energy reflected from the eye of said person and for producing an infrared signal representative of said reflected energy, means producing a visible light signal representative of the modulation of vsible light, and means for indicating the phase between said infrared signal and said visible light signal.

4. The combination of apparatus defined in claim 3 and including means for converting the infrared energy reflected from the eye to a visual representation.

5. An apparatus for analyzing the response of the human eye to light stimulus comprising, a source of visible light, means for modulating said visible light, means for monitoring said modulated light, said means being operatively connected to control said modulation for maintaining a desired light intensity, a source of infrared energy, optical means for directing said modulated visible light and said infrared energy to the eye of a person being examined, infrared sensitive means positioned to receive infrared energy reflected from the eye of said person and for producing a visible light signal representative of the modulation of said visible light, and recording means connected to receive and simultaneously record said infrared and said visible signals.

6. An apparatus for analyzing the response of the human eye to light stimulus comprising, a source of visible light, means for focusing said light on a small area entirely within the pupil and closely adjacent the iris of the eye of the person being examined, a source of infrared energy, means for directing said infrared energy to the eye of the person being examined so as to irradiate at least the entire iris area, infrared-sensitive means positioned to receive infrared energy reflected from the eye and to produce a signal representative of said reflected infrared energy, means for producing a signal representative of the intensity of said visible light, and means connected to receive and simultaneously record the signal produced by said infrared sensitive means and the signal representative of the intensity of said visible light.

7. An apparatus for analyzing the response of the human eye to light stimulus comprising, sources of visible light and infrared energy, an optical system for directing said visible light and said infrared energy to the eye of the person being examined, said optical system including means for sharply focusing the visible light entirely within the pupil area adjacent the iris and including further means for irradiating all of the area within the iris periphery with a constant amount of infrared energy, infrared-sensitive means positioned to receive infrared energy reflected from the eye for producing a first electrical signal as a function thereof, means for producing a second electrical signal representative of the intensity of said visible light, and a dual recorder connected to receive and simultaneously record said first and second signals.

References Cited in the file of this patent
UNITED STATES PATENTS 2,482,669    Harding _____ Sept. 20, 1949
2,573,464    Lowenstein _____ Oct. 30, 1951

OTHER REFERENCES

Journal of the Optical Society of America, vol. 38, No. 8, August 1948, pp. 719–722. (Copy in Div. 7.)